United States Patent
Venable, Sr.

(10) Patent No.: US 7,813,274 B1
(45) Date of Patent: Oct. 12, 2010

(54) DYNAMIC DEMULTIPLEXING OF NETWORK TRAFFIC

(75) Inventor: Jeffrey C. Venable, Sr., Union City, CA (US)

(73) Assignee: Symantec Corporation, Mountain View, CA (US)

(*) Notice: Subject to any disclaimer, the term of this patent is extended or adjusted under 35 U.S.C. 154(b) by 948 days.

(21) Appl. No.: 11/026,525

(22) Filed: Dec. 30, 2004

(51) Int. Cl.
*G01R 31/08* (2006.01)

(52) U.S. Cl. .................. 370/230; 370/392; 726/22; 706/46

(58) Field of Classification Search .................. None
See application file for complete search history.

(56) References Cited

U.S. PATENT DOCUMENTS

| | | | | |
|---|---|---|---|---|
| 5,793,763 | A * | 8/1998 | Mayes et al. | 370/389 |
| 6,330,226 | B1 * | 12/2001 | Chapman et al. | 370/232 |
| 7,089,565 | B2 * | 8/2006 | Kan et al. | 719/315 |
| 7,607,170 | B2 * | 10/2009 | Chesla | 726/22 |
| 7,617,170 | B2 * | 11/2009 | Chesla | 706/46 |
| 2004/0098617 | A1 * | 5/2004 | Sekar | 713/201 |
| 2004/0250127 | A1 * | 12/2004 | Scoredos et al. | 713/201 |

OTHER PUBLICATIONS

Microsoft, You cannot make more than one client connection or a NAT device, Nov. 30, 2004, pp. 1-3.
Microsoft, Internet Information on Services Features, Apr. 19, 1999, pp. 1-6.

* cited by examiner

*Primary Examiner*—Robert W Wilson
(74) *Attorney, Agent, or Firm*—Hunton & Williams LLP

(57) ABSTRACT

Dynamic demultiplexing of network traffic to maximize availability of a source restricting service is disclosed. In one embodiment, a request is received from a host associated with a first network space to establish a connection to a source restricting service associated with a second network space. In one embodiment, the request is received at a node configured to use network address translation or similar techniques to facilitate communication between hosts associated with the first network on the one hand and hosts associated with the second network on the other. If establishing the requested connection using a first source identifier would result in a per source limit associated with the source restricting service being exceeded with respect to the first source identifier, a second source identifier is instead used to establish the requested connection.

29 Claims, 9 Drawing Sheets

DYNAMIC DEMULTIPLEXING OF NETWORK TRAFFIC

FIELD OF THE INVENTION

The present invention relates generally to making connections between network spaces. More specifically, dynamic demultiplexing is disclosed.

BACKGROUND OF THE INVENTION

A network address translation (NAT) device, or gateway device, multiplexes network client traffic between network spaces. Typically, the gateway device translates multiple source Internet protocol (IP) addresses from a private network namespace into a single IP address point of origin in the Internet (or other external) namespace. Similarly, the gateway device translates multiple source IP addresses from the Internet into a single IP address in the private network namespace, such that connections from multiple external sources appear on the internal network as being associated with the same source IP address, i.e., that of the gateway device.

FIG. 1 illustrates a gateway device multiplexing network client traffic between two network spaces. Network space 100, labeled Internet, contains a plurality of network-connected hosts (e.g., host 102). Network space 110, labeled subnet, contains network hosts. The network hosts in the example shown include web server 112, mail server 114, and application server 116, but more or fewer hosts may exist in the network space. Network traffic between network space 100 and network space 110 passes through gateway 106. Gateway 106 presents a single IP address 104 to network space 100 and similarly a single IP address 108 to network space 110.

Having separate Internet and private network namespaces improves security, because traffic must pass through the gateway device in order to reach the one network from the other, and saves resources by conserving the number of IP addresses used in private networks and in the Internet.

A problem arises when there is a service that limits access by source IP address. For example, a service may limit the number of connections that can be made from a single IP address. The term "source restricting service" is used herein to refer to a service or other network-based resource that limits the number of connections that can be made or maintained at a time by a single source. In a typical configuration, clients on one side of a gateway device that wish to simultaneously connect to a service on the other side of the gateway device (e.g., application server 116 in the example shown in FIG. 1) appear to the service as multiple requests from a single client. The service will then either accept first requestors, but deny subsequent requestors after a service request limit has been reached, or accept first requestors, and accept subsequent requestors and disconnect first requestors to stay within a service request limit. In either case, the gateway device solution results in denial of service to some requestors and has scalability problems because the larger the networks on either side of the gateway device, the more clients will appear to come from the same entity and be limited by a source based restriction.

One possible solution would be to have the gateway device either not be present or not use NAT, such that each host on the external network would appear to a host on the internal network to have a different source IP address, i.e., its globally unique IP address on the external network. FIG. 2 illustrates an approach in which NAT is not used such that each host on the external network appears to hosts on the internal network to have a different (i.e., unique) IP address. Network space 200, labeled Internet, has network hosts 208, 210, 212, and 214 each of which has a globally unique IP address in the external network (i.e., Internet) namespace. External hosts 208-214 connect to application server 230, mail server 232, and web server 234 on internal network 240, either directly or via a gateway or other intermediary device not using NAT, such that each connection is associated with a unique source IP address. In the example shown in FIG. 2, external hosts 208 and 210 have connected to application server 230 each using its own source IP address, such that no problem would arise if application server 230 limited connections to one per source IP address. The problem with the solution illustrated in FIG. 2 is that it consumes resources in external network namespace, because it requires that each host on internal network 240 be assigned an IP address that is unique in the external network namespace. In addition, it discards the security benefits gained from having disjoined namespaces, as outlined above. Furthermore, it could be entirely unnecessary if there is never an attempt by multiple clients on the external network to access a service on the internal network that has a source-based limitation associated with it.

Therefore, there is a need for a solution that allows a gateway to serve the need of multiple clients from one network space to simultaneously access a source restricting service without consuming unnecessarily network space resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic demultiplexing of network traffic to maximize availability of a source restricting service is disclosed. In one embodiment, a request is received from a host associated with a first network space to establish a connection to a source restricting service associated with a second network space. In one embodiment, the request is received at a node configured to use network address translation or similar techniques to facilitate communication between hosts associated with the first network on the one hand and hosts associated with the second network on the other. If establishing the requested connection using a first source identifier would result in a per source limit associated with the source restricting service being exceeded with respect to the first source identifier, a second source identifier is instead used to establish the requested connection.

Figure 1:
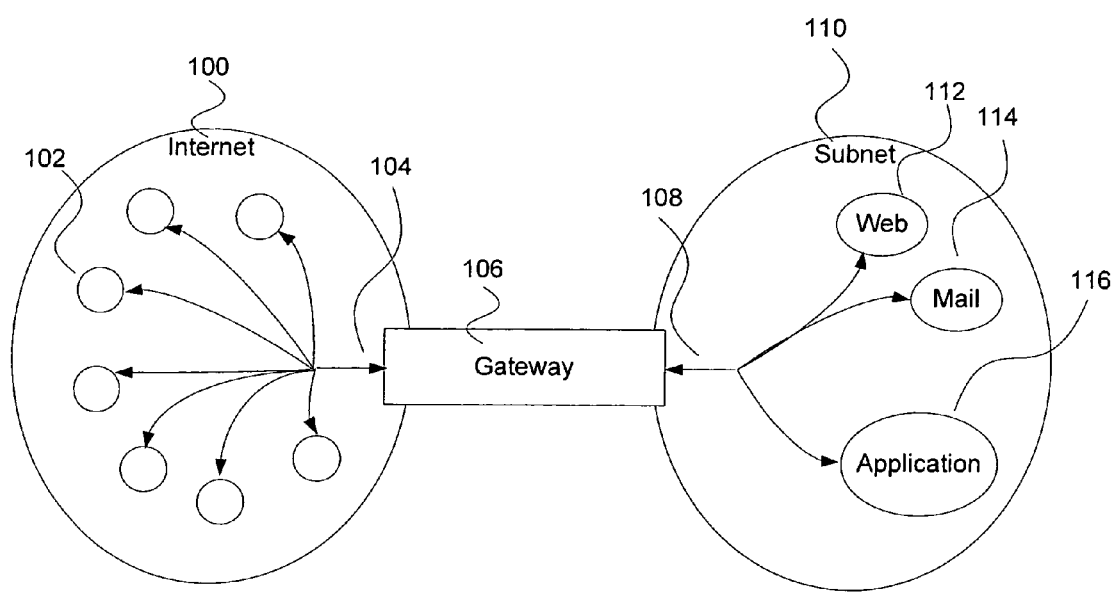
FIG. 1 illustrates a gateway device multiplexing network traffic between two network spaces.
Figure 2:
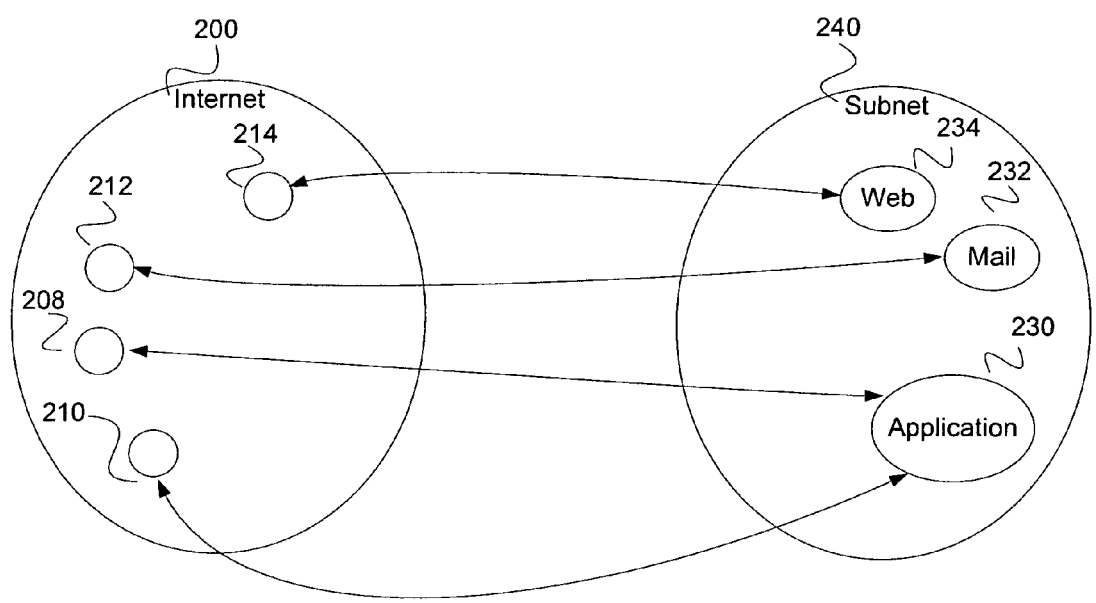
FIG. 2 illustrates an approach in which NAT is not used such that each host on the external network appears to hosts on the internal network to have a different (i.e., unique) IP address.
Figure 3:
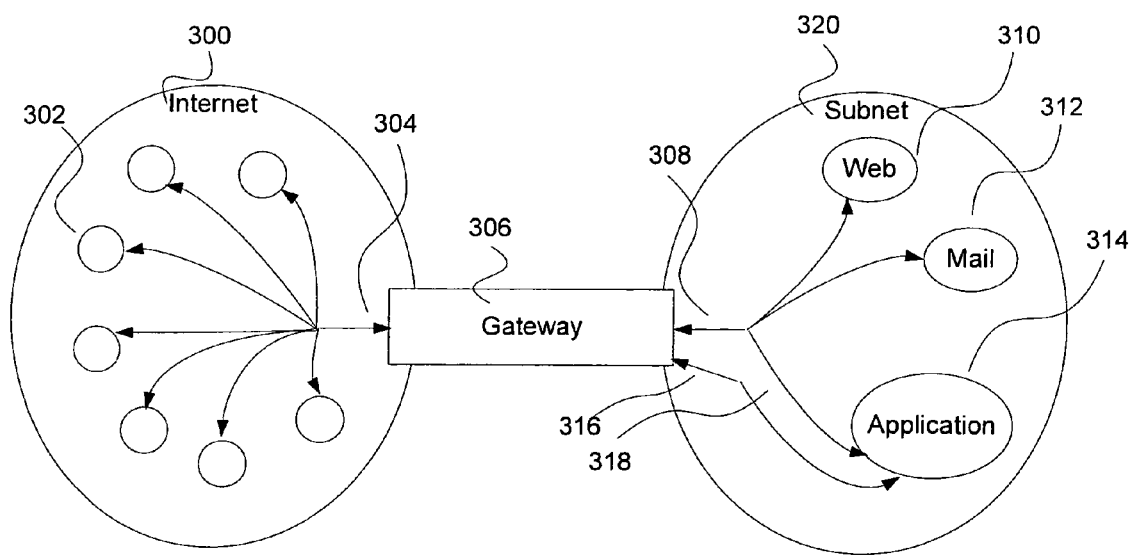
FIG. 3 illustrates a gateway device configured to dynamically demultiplex network traffic between two network spaces.

FIG. 3 illustrates an embodiment of a gateway device configured to dynamically demultiplex network traffic between two network spaces. As used herein, the term "dynamically demultiplex" refers to deviating from standard NAT techniques when required to establish a requested connection to a source restricting service by using a second, third, fourth, etc. address or other identifier as a source address to establish at least a final leg of the connection to the service when a first address that might otherwise have been used to establish the connection is already being used to facilitate one or more previously requested connections to the service such that a per source limit associated with the source restricting service would be exceeded if the newly requested connection were also serviced using the first address. Network space 300, labeled Internet, contains a plurality of network hosts (e.g., network client 302). Network space 320, labeled subnet, contains network hosts. The network hosts in the example shown include web server 310, mail server 312, and application server 314, but more or fewer hosts may exist in the network space. Network traffic between network space 300 and network space 320 passes through gateway 306. Gateway 306 presents a single IP address 304 to network space 300. Gateway 306 presents primarily a single IP address 308 to network space 320. If there is a source restricting service (in the example shown in FIG. 3, application server 314 is a source restricting service), in some embodiments gateway 306 is configured to dynamically assign IP addresses as required to maximize the number of simultaneous connections that can be made and maintained to the source restricting service without the per source restriction coming into play solely by virtue of the application of NAT at gateway 306. Note that other restrictions may apply, such as a license or other restriction limiting the total number of connections that may be made or maintained at a time.

In order to do this, gateway 306 has information as to which resources in the network space are source-restricting services. In some embodiments, this information is input by an administrator of the gateway. In some embodiments, the destination IP address (or some other identifier) associated with each source restricting service is added to a list of source restricting services, and a connection request is detected as being associated with a source restricting service if the connection request comprises a request to connect to a service associated with a destination IP address (or other identifier) on the list. In some embodiments, an automatic detection occurs in the gateway for traffic that is frequently dropped when multiple requests are directed to a specific application. This application is then flagged as a potential source restricting service. The gateway administrator is then alerted that there is a potential source restricting service and the administrator can chose to enter this information onto the source restricting service list. In some embodiments, the application is automatically placed on a source restricting service list.

When receiving a request from a network client in one network space for traffic to go to a source restricting service in another network space, Gateway 306 dynamically assigns IP addresses (and/or port numbers) by detecting whether or not connections already exist to the source restricting service. In the example shown in FIG. 3, a connection 318 in which primary IP address 308 is used as the source IP address associated with the connection is shown to exist and so the gateway then assigns to the next traffic request to connect to the source restricting service a different IP address which is used to establish connection 316. In this example, the source restricting service has a limit of one connection per source IP address. In some embodiments, the source restricting service has a different limit. In the case of a different limit, gateway 306 would assign the same IP address (e.g., address 308) for a given request if the request were within the applicable per source limit, but would assign a different IP address for a request that exceeds the source limit. In some embodiments, the source-restricting service limits connections based on an identifier other than the source IP address, e.g., the source port number or other identifier and gateway 306 as required dynamically assigns a source identifier of the type on which the source restriction is based.

The gateway 306 could in theory be configured to use a different internal IP address as the source address for each connection made with a host on the internal network, which would avoid any per source limit being exceeded, but depending on the circumstances there would be a risk that the internal namespace would be exhausted.

Figure 4:
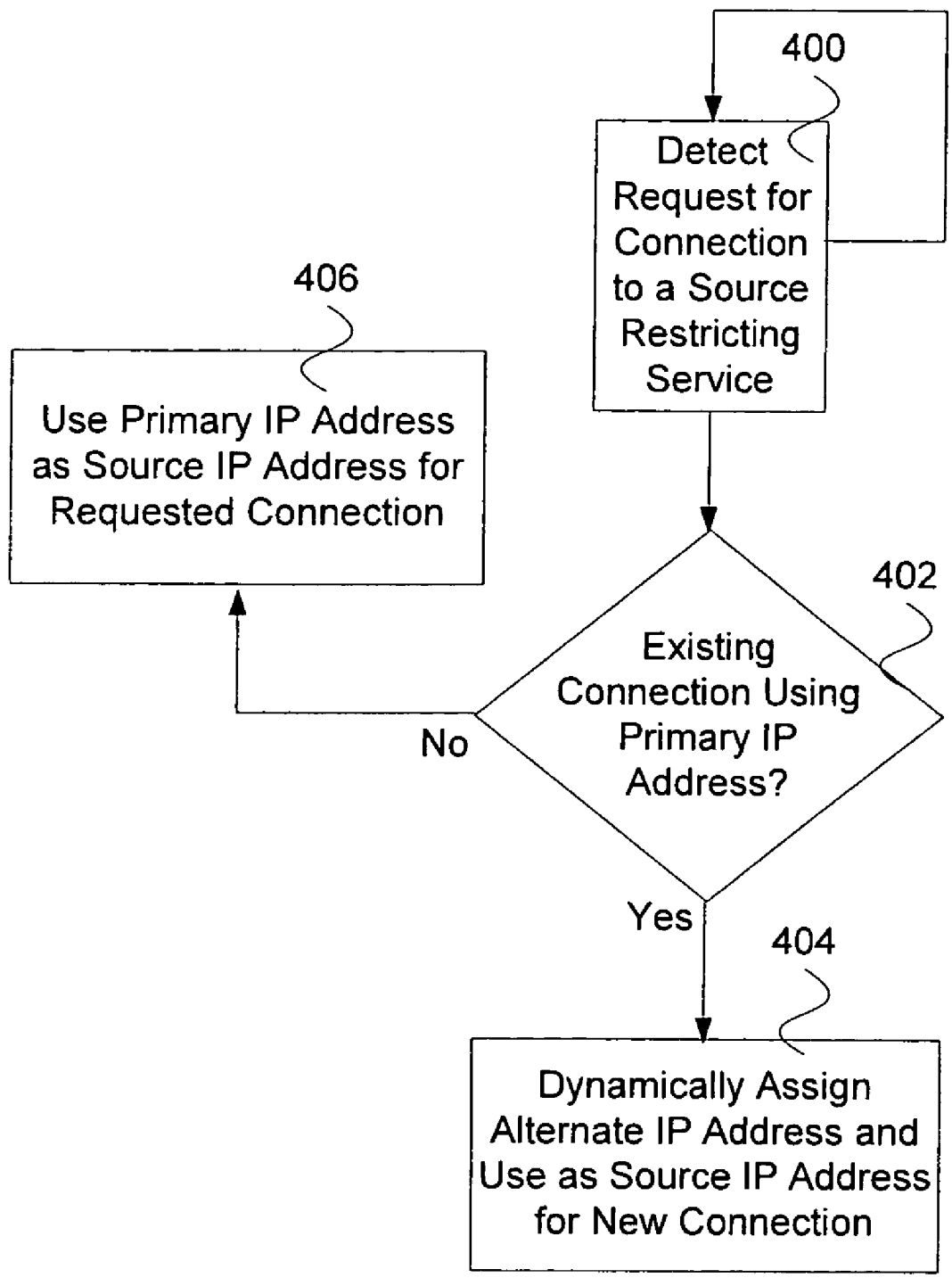
FIG. 4 illustrates a process for dynamically demultiplexing network traffic.

FIG. 4 illustrates an embodiment of a process for dynamically demultiplexing network traffic. In 400, a request for connection from a client in one network space to a source restricting service in another network space is received. In 402 it is determined if there is an existing connection using a primary IP address. If there is not an existing connection, then in 406 the primary address is used as a source IP address for the requested connection. If there is an existing connection, then in 404, an alternate IP address is dynamically assigned as a source IP address for the requested new connection.

In this example, the source limit is one connection per source IP address. If the source limit were greater than one, then the primary address could be used as a source IP address up to the limit, and an alternate IP address could be dynamically assigned as a source IP address after the limit is exceeded.

In some embodiments, the alternate IP address is taken from a statically configured pool of alternate addresses. In some embodiments, the alternate IP address is dynamically assigned via Dynamic Host Configuration Protocol (DHCP). In this example the source restriction limits the number of connections made using a particular source IP address, but in other embodiments the restriction may be based on an identifier other than a source IP address and/or some other data associated with the source.

In some embodiments, no IP address is identified or intended as the "primary" address and in some such embodiments 402 includes determining whether an IP address from a pool of addresses is available for use in establishing the connection. If one or more addresses is/are available, an available address is selected and used to service the request. If all of the addresses in the pool are in use, the connection is not established and an indication is provided to the requesting host that the service is not available.

Figure 5:
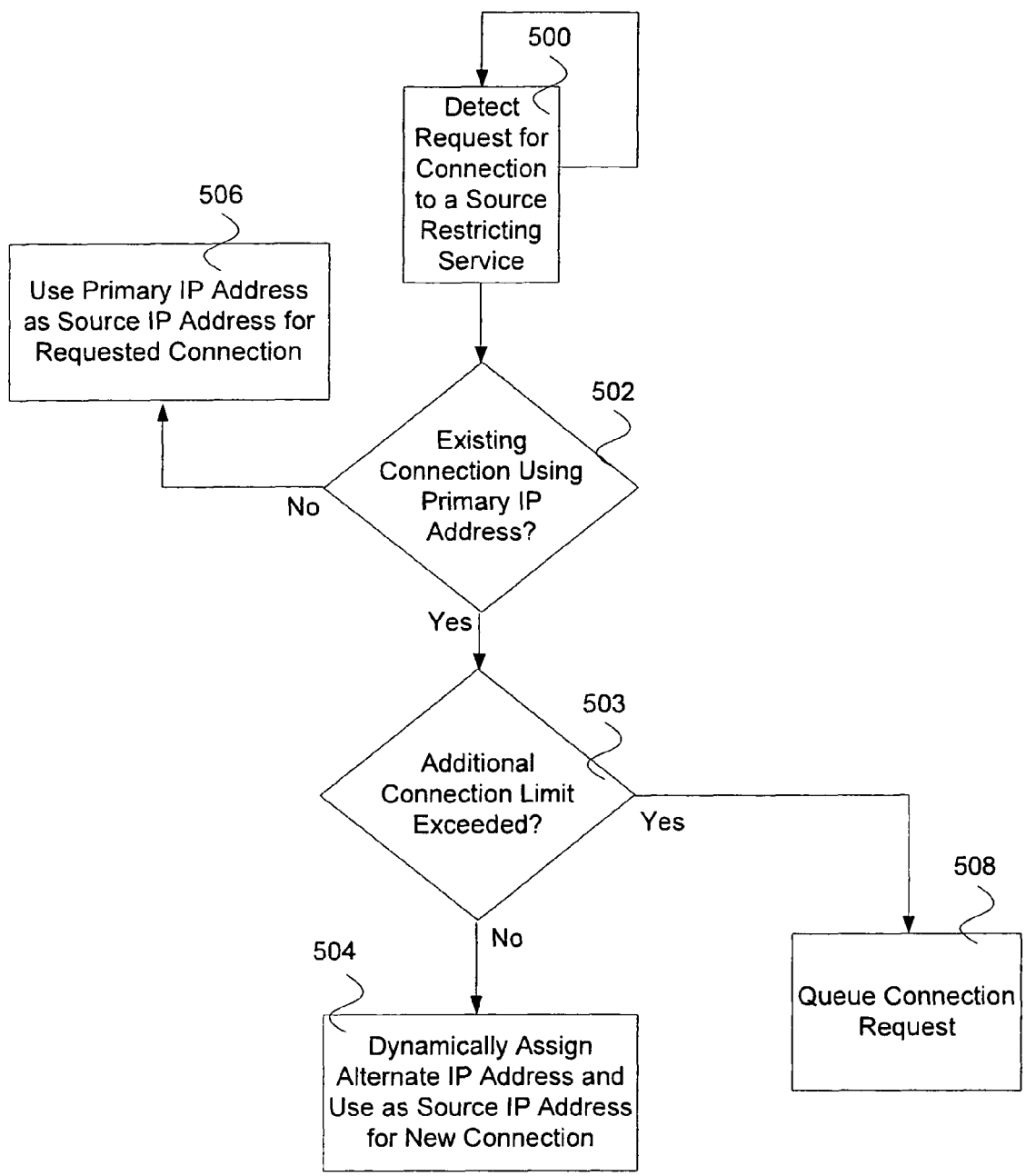
FIG. 5 illustrates a process for dynamically demultiplexing network traffic.

FIG. 5 illustrates an embodiment of a process for dynamically demultiplexing network traffic. In 500, a request for connection from a network client in one network space to a source restricting service in another network space. In 502 it is determined if there is an existing connection using a primary IP address. If there is not an existing connection, then in 506 the primary address is used as a source IP address for the requested connection. If there is an existing connection, then in 503 it is determined if an additional connection limit would be exceeded if the requested connection were made. For example, a license may limit use of the service to five users at any given time, apart from any restriction that may limit the number of connections that may be made from any given source. If establishing the requested connection would exceed no additional connection limit, an alternate IP address is dynamically assigned in 504 as a source IP address for the requested new connection. If an additional connection limit would be exceeded if the requested connection were established, the connection request is queued in 508.

Figure 6:
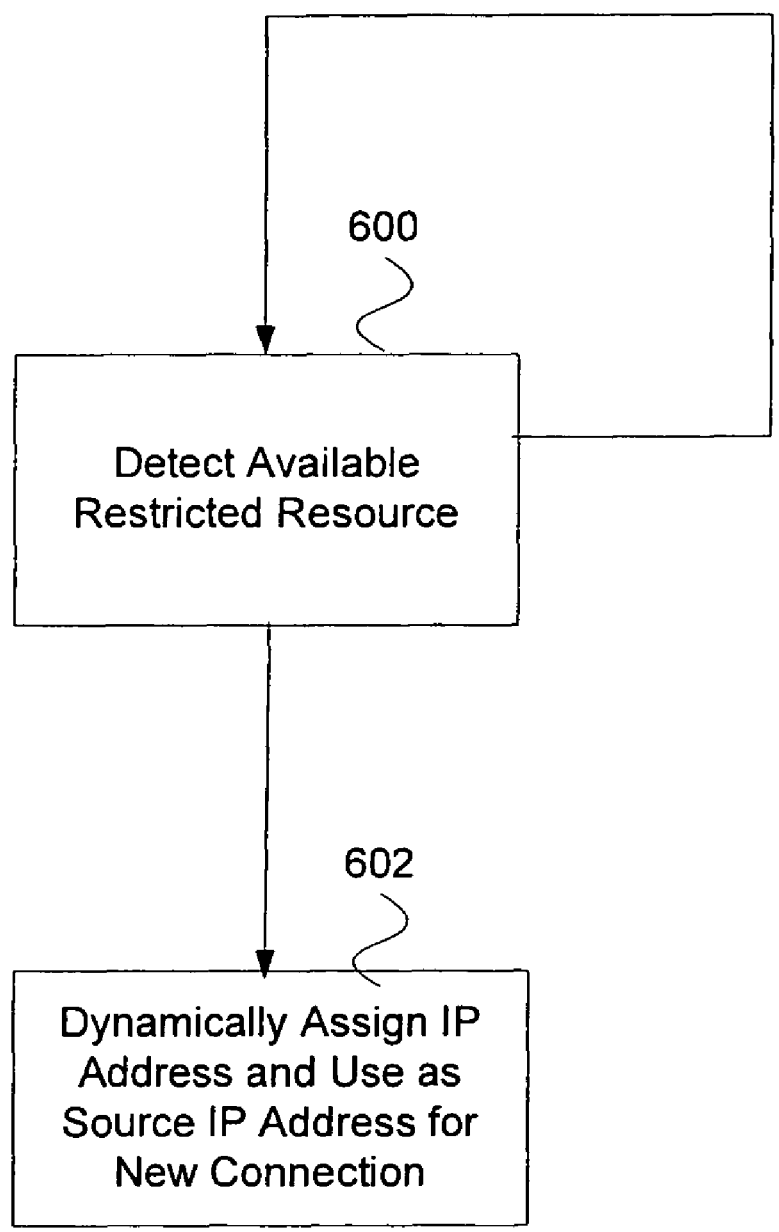
FIG. 6 illustrates a process for handling a queued request for connection.

FIG. 6 illustrates an embodiment of a process for handling a queued request for connection. In 600, availability of a restricted resource is detected. For example, a connection made using one of a limited pool of available IP address may be terminated, e.g., upon completion by the external host on whose behalf the connection was established, thereby freeing the IP address that had been used to make and maintain the connection for use in servicing another request. If a restricted resource becomes available, in 602 an IP address is dynamically assigned as a source IP address to be used to service a queued connection request, if any. In some embodiments, priority schemes may be used to determine which queued request is to be serviced using the resource that has been detected as having become available.

Figure 7:
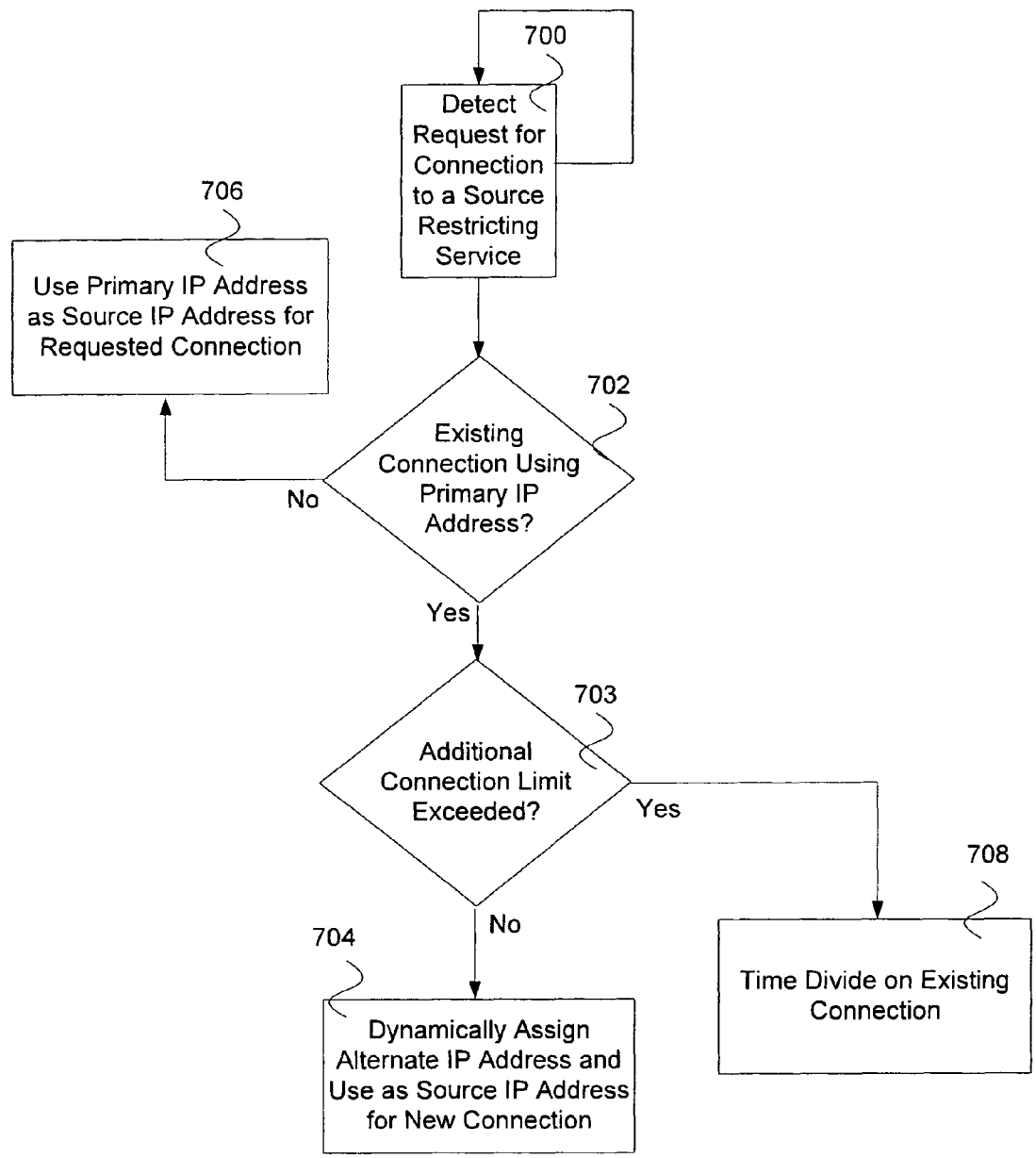
FIG. 7 illustrates a process for dynamically demultiplexing network traffic.

FIG. 7 illustrates an embodiment of a process for dynamically demultiplexing network traffic. In 700, a request for connection is received from a network client in one network space to a source restricting service in another network space. In 702 it is determined if there is an existing connection using a primary IP address. If there is not an existing connection, then in 706 the primary address is used as a source IP address for the requested connection. If there is an existing connection, then in 703 it is determined if an additional connection limit would be exceeded if the requested connection were made. If no additional connection limit would be exceeded if the requested connection were established an alternate IP address is dynamically assigned in 704 as a source IP address for the requested new connection. If an additional connection limit would be exceeded if the requested connection were established as a new connection, the connection request is serviced in 708 by time dividing an existing connection to service the needs of both the requesting client on whose behalf the existing connection was established and the client from which the request received at 700 was received.

Figure 8:
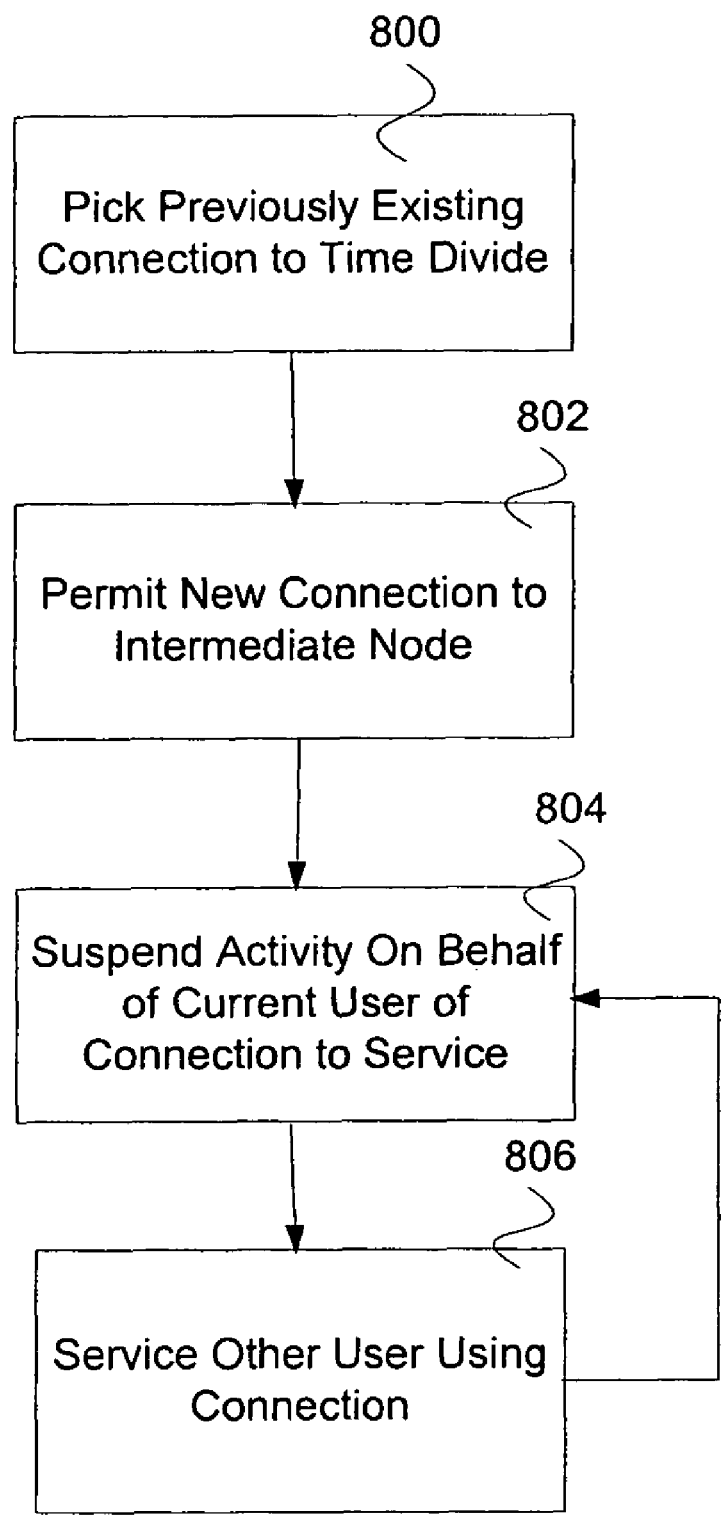
FIG. 8 illustrates a process for time dividing a connection.

FIG. 8 illustrates an embodiment of a process for time dividing a connection. In some embodiments, the process of FIG. 8 is used to implement 708 of FIG. 7. In 800, an existing connection to the source restricting service (e.g., a connection made previously on behalf of a requesting host A) is picked for time dividing. In some embodiments, the connection picked for time dividing is the oldest connection. In some embodiments, the connection picked for time dividing has the least traffic. In 802, a new connection is permitted to be established between the client that made the later-received connection request that is being processed (e.g., from a host B) and an intermediate node, e.g., a gateway, such as an intermediate node at which the process of FIG. 8 is being implemented. In 804, use by the current user (i.e., either the host A on whose behalf the connection to the source restricting service was established, as would be the case for example in the first iteration of the process of FIG. 8, or the host B from which the later-received request was received) of the connection between the intermediate node and the source restricting service that is being time divided is suspended. In 806, the connection is used to service the other user (e.g., the host B in the first iteration of the process of FIG. 8). After a period of time, in 804, the use of the connection to the source restricting service by the current user is again suspended and the connection is used in 806 to service the other user. 804 and 806 repeat until it is no longer necessary to time-divide the connection to the source restricting service (e.g. when the number of connections required drops below the connection limit). In some embodiments, the time division is based on equal time period sharing of the connection. In some embodiments, the time division is based on the relative amount of traffic required by each client.

Figure 9:
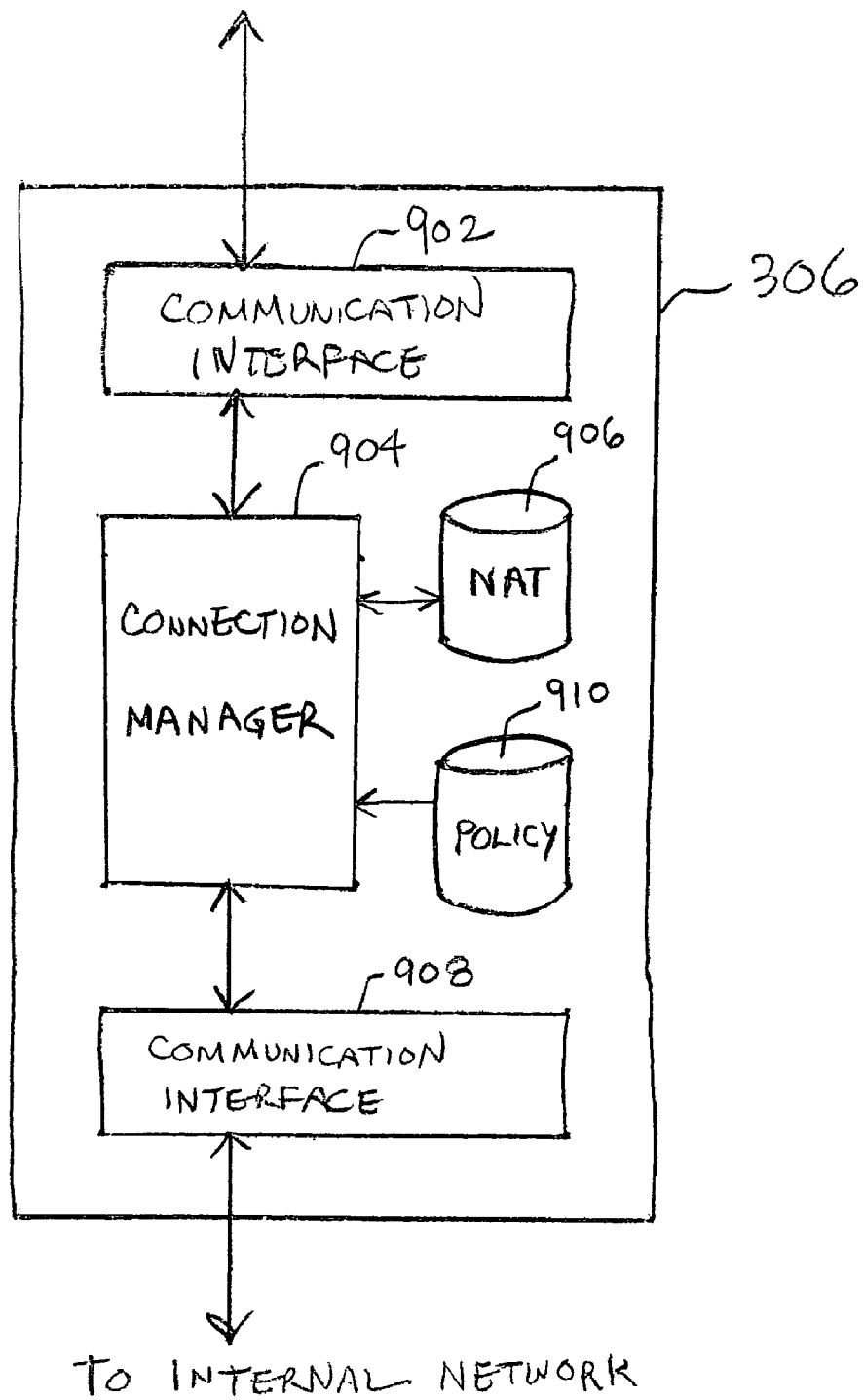
FIG. 9 illustrates an embodiment of a gateway configured to dynamically demultiplex network traffic.

FIG. 9 illustrates an embodiment of a gateway configured to dynamically demultiplex network traffic. In the embodiment shown in FIG. 9 gateway 306 of FIG. 3 includes an outward facing communication interface (e.g., a network interface card or other interface) 902 configured to present to an external network (e.g., Internet 300 of FIG. 3) a single IP address by which the gateway 306 is identified uniquely in the external network's namespace. A connection manager 904 receives via communication interface 902 requests from hosts on the external network to establish connections with hosts on an internal network (e.g. subnet 320 of FIG. 3) with which the gateway 306 is associated. The connection manager in one embodiment comprises logic and processes running on a general purpose or application specific processor. The connection manager maintains and uses a network address translation database 906, e.g., a NAT table, to manage connections between hosts on the external network and hosts on the internal network, including by using NAT techniques to enable connections to be made to and by multiple hosts on the internal network using the single IP address by which the gateway 306 is known on the external network. Network traffic to and from hosts on the internal network is sent/received via an inward facing communications interface 908. A policy (and/or configuration) database 910 serves as a repository for policy and/or configuration information, such as the identity and applicable per source limits associated with any source restricting services on the internal network. In some embodiments, the connection manager 904 detects, based at least in part on data stored in policy database 910, when a request received from a host on the external network would result in an applicable per source limit associated with a source restricting service would be exceeded if the requested connection were serviced using a first address by which the gateway is known on the internal network and dynamically use a second address instead of the first address to establish the connection with the source restricting service on behalf of the requesting host. In some embodiments, the connection manager stores in the NAT database 906 data associating the second address with the connection established using that address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for dynamically demultiplexing network traffic comprising:
   detecting at a computer that a communication received from a requesting host comprises a request for a connection to a service that has a per source limit on the number of connections that a source is permitted to have with the service at the same time;
   determining at the computer whether using a first source identifier to establish the connection on behalf of the requesting host results in the per source limit being exceeded; and
   using a second source identifier at the computer to establish the connection on behalf of the requesting host based at least in part on the determination that using the first source identifier to establish the connection results in the per source limit being exceeded,
   wherein using the second source identifier to establish the connection on behalf of the requesting host is benevolent.

2. The method as recited in claim 1, further comprising determining if there are any existing connections to the service using the first source identifier.

3. The method as recited in claim 1, further comprising determining if there are any existing connections to the service using the first source identifier and, if so, whether the per source limit is exceeded if the connection were established using the first source identifier.

4. The method as recited in claim 1, wherein the first source identifier is an IP address.

5. The method as recited in claim 1, wherein the first source identifier is a port number.

6. The method as recited in claim 1, wherein detecting a request for a connection to a service that has a per source limit on the number of connections that a source is permitted to have with the service at the same time includes determining whether the request is associated with a destination identifier that is associated with a source restricting service.

7. The method as recited in claim 6, wherein the destination identifier comprises a destination address.

8. The method as recited in claim 1, wherein the second source identifier comes from a statically configured pool.

9. The method as recited in claim 1, wherein the second source identifier comes from a dynamic assignment.

10. The method as recited in claim 1, further comprising servicing the request only if doing so does not result in an overall limit on the number of connections that may be maintained with the service at the same time being exceeded.

11. The method as recited in claim 1 further comprising queuing the connection request if servicing the request immediately results in an overall limit on the number of connections that may be maintained with the service at the same time being exceeded.

12. The method as recited in claim 1, further comprising time dividing on an existing connection to the service if servicing the request by establishing a new separate connection to the service results in an overall limit on the number of connections that may be maintained with the service at the same time being exceeded.

13. The method as recited in claim 1, wherein the request is received from a host associated with a first network space and the service is associated with a host associated with a second network space.

14. A system for dynamically demultiplexing network traffic comprising:
    a communication interface configured to receive from a requesting host a request for a connection to a service; and
    a processor configured to:
       detect that the service has a per source limit on the number of connections that a source is permitted to have with the service at the same time;
       determine whether using a first source identifier to establish the connection on behalf of the requesting host results in the per source limit being exceeded; and
       use a second source identifier to establish the connection on behalf of the requesting host based at least in part on the determination that using the first source identifier to establish the connection results in the per source limit being exceeded,
    wherein the use of the second source identifier to establish the connection on behalf of the requesting host is benevolent.

15. The system as recited in claim 14, wherein the processor is further configured to determine if there are any existing connections to the service using the first source identifier.

16. The system as recited in claim 14, wherein the processor is further configured to determine if there are any existing connections to the service using the first source identifier and, if so, whether the per source limit is exceeded if the connection were established using the first source identifier.

17. The system as recited in claim 14, wherein the processor is configured to detect that the service has a per source limit on the number of connections that a source is permitted to have with the service at the same time by determining whether the request is associated with a destination identifier that is associated with a source restricting service.

18. The system as recited in claim 14, wherein the processor is configured to service the request only if doing so does not result in an overall limit on the number of connections that may be maintained with the service at the same time being exceeded.

19. The system as recited in claim 14, wherein the processor is configured to queue the connection request if servicing the request immediately results in an overall limit on the number of connections that may be maintained with the service at the same time being exceeded.

20. The system as recited in claim 14, wherein the processor is configured to time divide an existing connection to the service if servicing the request by establishing a new separate connection to the service results in an overall limit on the number of connections that may be maintained with the service at the same time being exceeded.

21. The system as recited in claim 14, wherein the request is received from a host associated with a first network space and the service is associated with a host associated with a second network space.

22. A non-transitory computer readable storage medium having stored thereon computer instructions which when executed by a computer cause the computer to perform the steps of:
    detecting that a communication received from a requesting host comprises a request for a connection to a service that has a per source limit on the number of connections that a source is permitted to have with the service at the same time;

determining whether using a first source identifier to establish the connection on behalf of the requesting host results in the per source limit being exceeded; and using a second source identifier to establish the connection on behalf of the requesting host based at least in part on the determination that using the first source identifier to establish the connection would result in the per source limit being exceeded, wherein using the second source identifier to establish the connection on behalf of the requesting host is benevolent.

23. The non-transitory computer readable storage medium as recited in claim 22, further comprising computer instructions for determining if there are any existing connections to the service using the first source identifier.

24. The non-transitory computer readable storage medium as recited in claim 22, further comprising computer instructions for determining if there are any existing connections to the service using the first source identifier and, if so, whether the per source limit is exceeded if the connection were established using the first source identifier.

25. The non-transitory computer readable storage medium as recited in claim 22, wherein detecting a request for a connection to a service with a per source limit on the number of connections that a source is permitted to have with the service at the same time includes determining whether the request is associated with a destination identifier that is associated with a source restricting service.

26. The non-transitory computer readable storage medium as recited in claim 22, further comprising computer instructions for servicing the request only if doing so does not result in an overall limit on the number of connections that may be maintained with the service at the same time being exceeded.

27. The non-transitory computer readable storage medium as recited in claim 22, further comprising computer instructions for queuing the connection request if servicing the request immediately results in an overall limit on the number of connections that may be maintained with the service at the same time being exceeded.

28. The non-transitory computer readable storage medium as recited in claim 22, further comprising computer instructions for time dividing on an existing connection to the service if servicing the request by establishing a new separate connection to the service results in an overall limit on the number of connections that may be maintained with the service at the same time being exceeded.

29. The non-transitory computer readable storage medium as recited in claim 22, wherein the request is received from a host associated with a first network space and the service is associated with a host associated with a second network space.

* * * * *